2,707,001

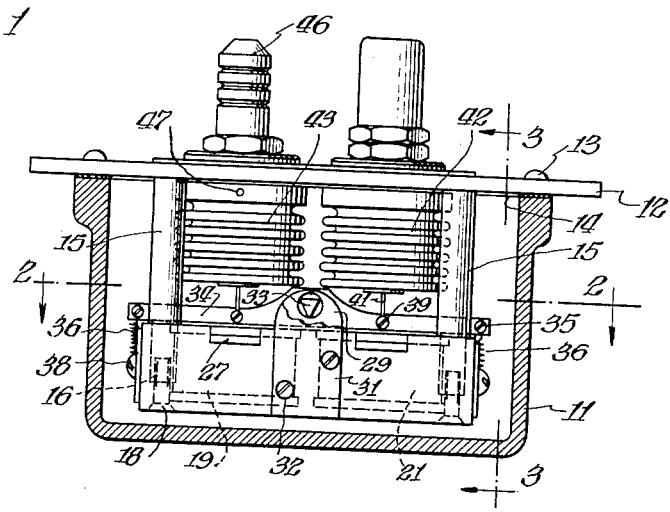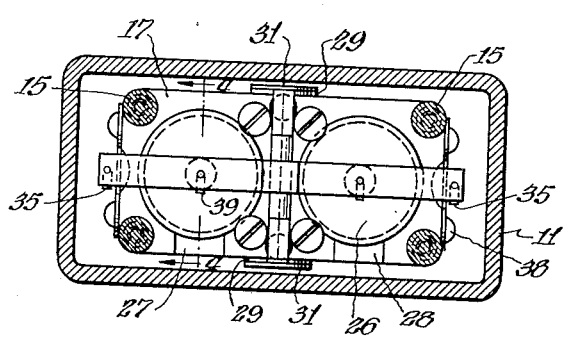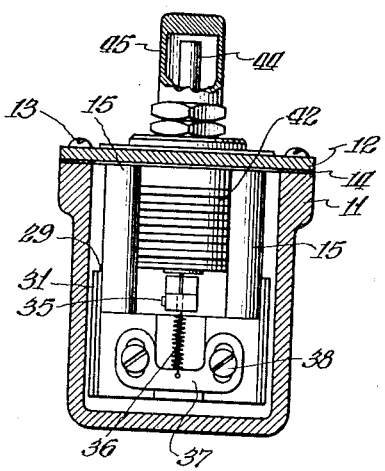

BALANCED BELLOWS PRESSURE HEAD

Claude M. Hathaway, Denver, Colo., assignor to Hathaway Instrument Company, Denver, Colo.

Application March 27, 1951, Serial No. 217,766

3 Claims. (Cl. 137—785)

The present invention relates to an electrical device for indicating pressure.

Frequently, in connection with aircraft and airborne devices, it is desirable to have a gauge responsive to pressure which in some cases may be relatively low. Heretofore a pressure gauge has been employed utilizing two similar bellows connected to an electric sensing device. The two bellows were arranged to be responsive to a difference of pressure existing between them. It has been found, however, that a response was obtained which did not correspond to the difference of pressure between the two bellows. It was ascertained that the housing for the two bellows permitted the development of what corresponded to a third pressure, which thus modified the response indicated by the electric sensing device.

Accordingly it is proposed, in accordance with the present invention, to obviate certain disadvantages encountered in the devices of the prior art. Among these disadvantages is the effect of hysteresis. Still another effect which is to be minimized or reduced is the variation which occurs when temperature changes.

It is, therefore, an object of this invention to provide an improved pressure responsive device which will be more accurate than corresponding devices heretofore employed.

A still further object of the invention is to provide an improved electric pressure head having a construction provided to compensate for the deleterious effects of temperature variations.

Still another object of the present invention is to provide an electric pressure head construction which will minimize the effect of hysteresis.

A still further object of the invention is to provide an improved electric pressure head having high sensitivity, great accuracy and a minimum of extraneous effects.

Further objects and advantages of the present invention subsequently will become apparent by reference to the following description taken in conjunction with the following drawing wherein:

Figure 1 is a view of the present invention wherein a section has been taken through the casing adjacent one side wall;

Figure 2 is a cross-sectional view of a portion of the apparatus shown in Figure 1 as seen along the line 2—2;

Figure 3 is a cross-sectional view as seen in the direction of the arrows along the line 3—3 of Figure 1; and Figure 4 is a cross-sectional view of a portion of the apparatus as seen in the direction of the arrows along the line 4—4 of Figure 2.

In the drawing there is shown a generally rectangular housing 11 having a cover 12 secured thereto by suitable fastening means 13. The housing is made air-tight by a gasket 14. Four posts 15 extend downwardly from the cover 12 and have reduced diameter portions 16 which are hollow and threaded inside. The reduced diameter portions extend into suitable apertures in a plate 17 of appreciable thickness, which is secured to the four posts 15 by screws 18. The plate 17 has two similar circular openings therein for receiving two coils 19 and 21. One of these coils is shown in cross section in Figure 4, from which it will be seen that a central core structure is provided comprising a rod 22 having reduced diameter portion 23, which extends through an aperture in the member 17 and is riveted therein. The rod 22 has a central or axial recess 24 into which is fitted another rod 25. The rod 25 is of a particular type of metal having a characteristic which changes its permeability in accordance with temperature. This change of characteristic is calculated to overcome a change in permeability in the remaining structure due to temperature variations. It will be noted from Figure 4 that the coil 19 may be provided with a protective cover or disk 26, which generally is of fiber.

From Figures 2 and 3 it will be noted that the member 17 at one side is provided with cut-away portions or recesses 27 and 28 so that connections may be brought out from the coils 19 and 21.

From Figures 1 and 3 it will be seen that on each side of the base member 17 there is provided an apertured plate 29 and a cover plate 31, both retained in position by a plurality of screws 32. The aperture of the plate 29 receives a knife edge 33 of a walking beam lever 34. At each end of the beam 34 there is provided a set screw 35 which clamps onto one end of a spring 36 having its other end secured to a cross plate 37. The cross plate 37 is secured in position by a plurality of screws 38. It has been found that by clamping one end of the spring 36 by the set screw 35 a connection is obtained which minimizes certain hysteresis effects in the operation of the device. The beam 34 at intermediate points also is provided with set screws 39 which engage piano wire connections 41 leading to two similar bellows 42 and 43. The beam 34, therefore, is engaged at its extremities by a plurality of springs 36 tending to hold the beam in a balanced position. The beam 34 is made of iron or other magnetic material so that it, together with the base member 17, provides complete magnetic paths for the electromagnetic coils 19 and 21. The coils 19 and 21, together with their magnetic circuits, therefore comprise an electric sensing device responsive to a differential action of the bellows 42 and 43.

The bellows 43, as may be seen from Figure 3, is connected to a tube 44 which may be sealed off after the bellows 42 has been evacuated. The sealed off tube 44 may be protected by a cover 45. This arrangement is provided where a pressure response is to be obtained relative to absolute pressure rather than differential pressure. The other bellows 43 is provided with a nipple 46 for receiving a suitable tube or conduit to receive pressure to be indicated.

The bellows 43, immediately beneath the mounting plate 12, is provided with an aperture or passage 47 so that any pressure applied through the tube 46 to the bellows 43 is likewise applied to the interior of the casing 11. The bellows 43, therefore, acts in this case as a mechanical balancing device to balance out the mechanical effects of the bellows 42. Each of the bellows 42 and 43 is connected through a piano wire connection 41 to the beam 34 by the set screw 39, which arrangement has been found to minimize undesired hysteresis effects in the operation of the device.

Where differential pressure is to be indicated rather than absolute pressure, the tube 44 and cap 45 of the bellows 42 is replaced by a nipple similar to the nipple 46 for the bellows 43. Such an arrangement then may be utilized to indicate relative or differential pressure.

From the foregoing description it will be appreciated that the present invention provides an improved electric pressure head wherein the pressure responsive devices comprising the two bellows are mechanically balanced and arranged in such mechanical relation as to minimize the effect of hysteresis. In one embodiment, such as that illustrated in the drawing, these bellows are connected to an electric sensing device of the electro-magnetic type. Those skilled in the art will appreciate that a structure comparable to the beam 34 may be replaced by some other arrangement, which will produce an electrical effect proportional to the displacement between the bellows 42 and 43. Any displacement or strain responsive electrical device may be employed.

In the present instance, the electric sensing device connected with the bellows 42 and 43 has a unique construction wherein the central core of each coil is provided with means for compensating the permeability variations ordinarily encountered with changes in temperature. In the arrangement shown, the effect is such that the sensitivity of the electric sensing device decreases as temperature increases because there is a decrease in the total permeability of the entire magnetic circuit and an effective increase in the air gap between the central poles of each of the coils and the armature 34.

While for the purpose of illustrating and describing the present invention a preferred embodiment has been shown in the drawing, it is to be understood that such variations are contemplated in the components employed and in their arrangement as may be commensurate with the spirit and scope of the invention set forth in the accompanying claims.

I claim as my invention:

1. The combination comprising a sealed housing, a pair of bellows mounted parallel to each other within said housing, each bellows having a passage extending to the exterior of said housing, one of said bellows having a passage in communication with the interior of said housing, a lever mounted so its longitudinal axis is perpendicular to the axis of said bellows and in the same plane thereof, said lever being pivoted at its center midway between said bellows, connections from said bellows to intermediate points on said lever, and spring means normally biasing said lever to a neutral position.

2. The combination comprising a sealed housing containing a pair of bellows mounted parallel to each other and each having a passage extending to the exterior of said housing, one of said bellows having a passage in communication with the interior of said housing, an armature mounted with its longitudinal axis perpendicular to and in the same plane as the axis of said bellows, said armature being pivoted at it center midway between said bellows, wire connections from said bellows to intermediate points on said armature, and spring means normally biasing said armature to a neutral position.

3. The combination comprising a sealed housing containing a pair of bellows mounted parallel to each other and each having passage extending to the exterior of said housing, one of said bellows having a passage in communication with the interior of said housing, an armature mounted with its longitudinal axis perpendicular to and in the same plane as the axis of said bellows, said armature being pivoted at its center midway between said bellows, wire connections from said bellows to intermediate points on said armature, said wire connections being clamped to said armature, and spring means normally biasing said armature to a neutral position, said springs each having one end clamped to said armature.

References Cited in the file of this patent

UNITED STATES PATENTS

| | | |
|---|---|---|
| 1,398,463 | Lee | Nov. 29, 1921 |
| 1,945,378 | Robbins | Jan. 30, 1934 |
| 2,059,393 | Polydoroff | Nov. 3, 1936 |
| 2,319,219 | Draper et al. | May 18, 1943 |
| 2,345,464 | De Giers | Mar. 28, 1944 |
| 2,371,299 | Johnson | Mar. 13, 1945 |
| 2,380,242 | Jewell | July 10, 1945 |
| 2,460,773 | Stimson | Feb. 1, 1949 |
| 2,486,587 | Callahan, Jr. et al. | Nov. 1, 1949 |
| 2,491,998 | Mikina | Dec. 20, 1949 |